(12) United States Patent
Kim et al.

(10) Patent No.: US 12,429,876 B2
(45) Date of Patent: Sep. 30, 2025

(54) ROBOT AND CONTROLLING METHOD THEREOF

(71) Applicant: SAMSUNG ELECTRONICS CO., LTD., Suwon-si (KR)

(72) Inventors: Jinwon Kim, Suwon-si (KR); Keunchan Oh, Suwon-si (KR); Chanho Yoon, Suwon-si (KR); Kyunghun Jang, Suwon-si (KR); Youmin Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 133 days.

(21) Appl. No.: 18/200,981

(22) Filed: May 23, 2023

(65) Prior Publication Data

US 2023/0297115 A1 Sep. 21, 2023

Related U.S. Application Data

(63) Continuation of application No. PCT/KR2021/017259, filed on Nov. 23, 2021.

(30) Foreign Application Priority Data

Jan. 12, 2021 (KR) ........................ 10-2021-0004267

(51) Int. Cl.
*G05D 1/00* (2024.01)
(52) U.S. Cl.
CPC ................................ *G05D 1/0214* (2013.01)
(58) Field of Classification Search
CPC .... G05D 1/0214; G05D 1/0274; G05D 1/024; B25J 9/16; B25J 11/00; B25J 5/007; B25J 9/0009; B25J 9/161; B25J 9/1664; B25J 9/1692; B25J 9/1694; B25J 19/02
See application file for complete search history.

(56) References Cited

U.S. PATENT DOCUMENTS 8,060,256 B2 11/2011 Kong et al.
8,315,737 B2 11/2012 Hyung et al.
(Continued)

FOREIGN PATENT DOCUMENTS

EP 3 076 845 B1 2/2019
JP 2004-318721 A 11/2004
(Continued)

OTHER PUBLICATIONS

International Search Report dated Feb. 25, 2022, issued by the International Searching Authority in International Application No. PCT/KR2021/017259 (PCT/ISA/210).
(Continued)

*Primary Examiner* — Abby Y Lin
*Assistant Examiner* — Dylan M Katz
(74) *Attorney, Agent, or Firm* — Sughrue Mion, PLLC

(57) ABSTRACT

Provided is a robot including: a body rotatable about a first shaft; a first drive wheel and a second drive wheel provided in the body to be rotatable about a second shaft that is perpendicular to the first shaft; at least one distance sensor provided on the second shaft; and a processor. The processor may acquire first distance information through the at least one distance sensor at each of a plurality of different points at which the body is located as the body moves; acquire second distance information through the at least one distance sensor in each of a plurality of different directions in which the body is directed as the body rotates; and acquire, based on the first distance information and the second distance information, acquire information about a location point of the robot on a map corresponding to a space in which the robot is located.

13 Claims, 13 Drawing Sheets

(56) References Cited

U.S. PATENT DOCUMENTS

| | | | |
|---|---|---|---|
| 9,058,039 B2 | 6/2015 | Lee et al. | |
| 9,908,432 B2 | 3/2018 | Park et al. | |
| 10,423,832 B1 | 9/2019 | Zhang et al. | |
| 10,921,818 B2 | 2/2021 | Ogawa et al. | |
| 2009/0292394 A1* | 11/2009 | Hyung | G05D 1/027 |
| | | | 700/251 |
| 2018/0024561 A1 | 1/2018 | Soh et al. | |
| 2019/0094874 A1* | 3/2019 | Ogawa | G05D 1/027 |
| 2020/0069134 A1* | 3/2020 | Ebrahimi Afrouzi | |
| | | | A47L 9/0472 |
| 2020/0269436 A1* | 8/2020 | Sasagawa | H04R 1/028 |
| 2020/0298415 A1 | 9/2020 | Sun et al. | |

FOREIGN PATENT DOCUMENTS

| | | |
|---|---|---|
| JP | 2019-57203 A | 4/2019 |
| KR | 10-0187252 B1 | 5/1999 |
| KR | 10-2008-0045523 A | 5/2008 |
| KR | 10-2009-0121092 A | 11/2009 |
| KR | 10-2010-0110188 A | 10/2010 |
| KR | 10-2017-0024844 A | 3/2017 |
| KR | 10-2017-0111767 A | 10/2017 |
| KR | 10-2021-0094388 A | 7/2021 |
| KR | 10-2280210 B1 | 7/2021 |
| KR | 10-2376150 B1 | 3/2022 |
| KR | 10-2424536 B1 | 7/2022 |
| WO | 2020/116933 A1 | 6/2020 |

OTHER PUBLICATIONS

Written Opinion dated Feb. 25, 2022, issued by the International Searching Authority in International Application No. PCT/KR2021/017259 (PCT/ISA/237).

Communication dated May 23, 2025, issued by the Korean Intellectual Property Office in Korean Application No. 10-2021-0004267.

* cited by examiner

ROBOT AND CONTROLLING METHOD THEREOF

CROSS-REFERENCE TO RELATED APPLICATIONS

This application is a bypass continuation of International Application No. PCT/KR2021/017259, filed on Nov. 23, 2021, which is based on and claims priority to Korean Patent Application No. 10-2021-0004267, filed on Jan. 12, 2021, the disclosures of which are incorporated by reference herein in their entireties.

BACKGROUND

1. Field

The disclosure relates to a robot performing a location recognition function and a controlling method thereof.

2. Description of Related Art

A home robot may be provided with a distance sensor for driving, and may identify the location of the robot in the space based on data acquired by the distance sensor. However, when a pair of drive wheels for driving are provided in a small robot, there may be a problem in that accurate distance sensing is difficult due to the unevenness of the ground or the deceleration and acceleration of the robot. Accordingly, there is a continuous need for a method for obtaining highly reliable distance information in various situations occurring in a driving process of a robot.

SUMMARY

Provided are a robot for identifying a position of a robot based on distance information sensed at a plurality of points or a plurality of directions while the robot is driving, and a control method thereof.

According to an aspect of the disclosure, a robot includes: a main body rotatable about a first shaft; first and second drive wheels provided in the main body to be rotatable about a second shaft that is perpendicular to the first shaft; at least one distance sensor provided on the second shaft; and at least one processor configured to: acquire first distance information through the at least one distance sensor at each of a plurality of different points at which the main body is located as the main body moves; acquire second distance information through the at least one distance sensor in each of a plurality of different directions in which the main body is directed as the main body rotates; and acquire, based on the first distance information and the second distance information, information about a location point of the robot on a map corresponding to a space in which the robot is located, based on the first distance information and the second distance information.

The first and second drive wheels may be configured so that the main body moves in a direction of a third shaft that is perpendicular to each of the first shaft and the second shaft.

The at least one distance sensor may include a first distance sensor disposed in a first area of the main body adjacent to the first drive wheel, and a second distance sensor disposed in a second area of the main body adjacent to the second drive wheel.

The each of first distance sensor and the second distance sensor may include a time of flight (ToF) sensor.

The robot may include a tilt sensor, wherein the at least one processor may be further configured to: acquire information about the location point at which the main body is located on the map based on third distance information excluding acquired fourth distance information, and wherein the fourth distance information may be acquired based on tilt information, which is obtained by the tilt sensor from the first distance information and the second distance information, being greater than or equal to a threshold tilt in a direction of a specific shaft.

The main body may have a spherical shape, and wherein the first and second drive wheels may be spaced apart from each other and may be provided to surround the main body in an outer side of the main body.

The map may include map distance information corresponding to each of a plurality of points on the map, and wherein the at least one processor may be further configured to: acquire third distance information based on a diameter of the main body, the first distance information, and the second distance information, identify fourth distance information corresponding to the third distance information from among the map distance information included in the map; and identify a point corresponding to the fourth distance information as the location point at which the robot is located.

The map may include map distance information corresponding to each of a plurality of points on the map, and wherein the at least one processor may be further configured to identify third distance information matching the first distance information and the second distance information from among the map distance information included in the map, and identify a point corresponding to the third distance information as the location point at which the robot is located on the map.

The at least one processor may be further configured to, based on the third distance information corresponding to the location point at which the robot is located on the map and fourth distance information obtained through the at least one distance sensor at the point being different, update the map distance information on the map based on the fourth distance information obtained through the at least one distance sensor.

According to an aspect of the disclosure, a method of controlling a robot includes: acquiring first distance information through at least one distance sensor at each of a plurality of different points at which the main body is located as the main body moves; acquiring second distance information through the at least one distance sensor in each of a plurality of different directions in which the main body is directed as the main body rotates; and acquiring information about a location point of the robot on a map corresponding to a space in which the robot is located, based on the first distance information and the second distance information.

The first and second drive wheels may be provided so that the main body moves in a direction of a third shaft, which is perpendicular to each of the first shaft and the second shaft.

The at least one distance sensor may include a first distance sensor disposed in a first area of the main body adjacent to a first drive wheel of the first and second drive wheels, and a second distance sensor disposed in a second area of the main body adjacent to a second drive wheel of the first and second Each of the first distance sensor and the second distance sensor may include a time of flight (ToF) sensor.

The acquiring information about the location point at which the robot is located may include, acquiring information about a point at which the main body is located on the map based on third distance information excluding acquired fourth distance information, and wherein the fourth distance information may be acquired based on tilt information, which may be obtained by a tilt sensor from the first distance information and the second distance information, being greater than or equal to a threshold tilt in a direction of a specific shaft.

The main body may have a spherical shape, and wherein the first and second drive wheels may be spaced apart from each other and surround the main body in an outer side of the main body.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B," or "A and B."

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

In the description, a "user" may refer to a person using a robot. An embodiment of the disclosure will be described in greater detail with reference to the attached drawings.

Figure 1:
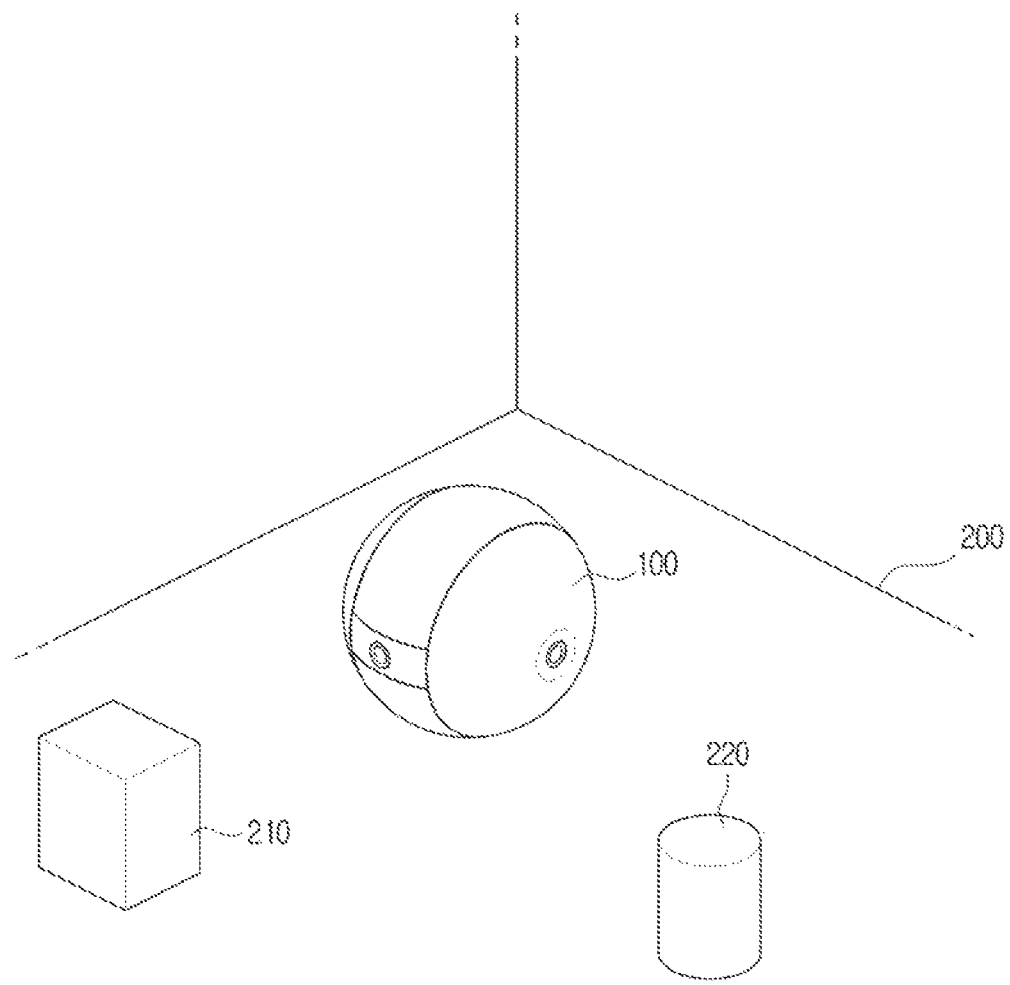
FIG. 1 is a diagram illustrating a robot driving in an indoor space.

FIG. 1 is a diagram illustrating a robot driving in an indoor space.

Referring to FIG. 1, in a space 200 where a robot 100 is driving, various objects 210, 220 may be present. In this example, the location of the objects 210, 220 and the location of the robot 100 need to be identified so that the robot 100 may drive in the space 200 without difficulty.

In particular, the robot 100 may identify the location of the objects 210, 220 and the location of the robot 100 based on map data corresponding to the space 200. The map data may be pre-stored in a memory (not shown) provided in the robot 100 or downloaded from an external server (not shown) in real time. According to an embodiment, the map data may include information on the space 200 and the objects 210, 220 included in the space 200.

Accordingly, the robot 100 according to an embodiment may identify the location of the robot 100 by measuring the distance from the robot to the wall surface of the space 200 or the objects 210, 220 located in the space 200.

However, the sensing range of the distance sensor provided in the robot 100 may be changed according to the motion of the robot 100. For example, an angle of view of a distance sensor provided in the robot 100 may also be inclined in a specific direction by motion in which the robot 100 is inclined in a specific direction. Here, the motion of the robot 100 according to an embodiment may be caused by the deceleration and acceleration of the robot 100. In addition, even when the robot 100 is driven at a constant speed, a motion in which the robot 100 is inclined in a specific direction may occur due to the inclination and unevenness of the ground or the limitation in control.

The distance information obtained while the angle of view of the distance sensor is inclined may be information corresponding to the distance from the robot 100 to the ground or ceiling of the space 200 from the robot 100, not the distance from the robot 100 to the wall surface or the object 210, 220 of the space 200.

Therefore, the robot 100 according to an embodiment obtains distorted information which does not help the driving of the robot 100 when the angle of view of the distance sensor is inclined, and thus it is important to obtain reliable distance information without distortion of a sensing range of the distance sensor even if a specific motion occurs in a driving process of the robot 100.

Accordingly, various embodiments in which a robot may accurately identify the location of a robot within a space by acquiring reliable distance information in various situations occurring during a driving process will be described in more detail.

Figure 2:
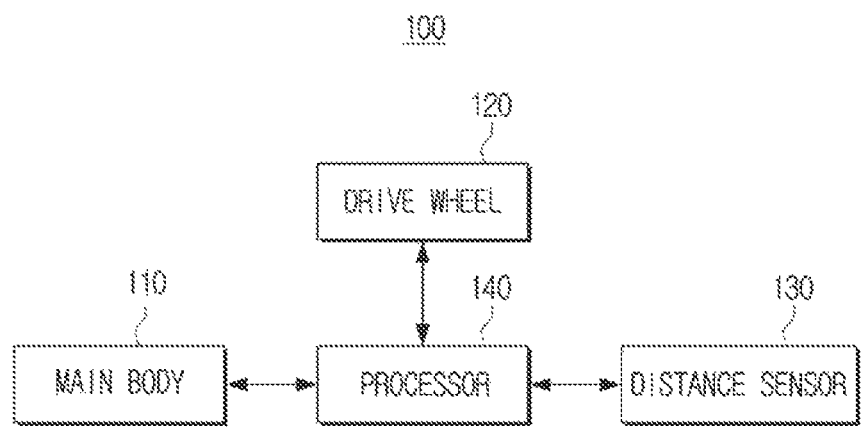
FIG. 2 is a block diagram illustrating a configuration of a robot according to an embodiment of the disclosure.

FIG. 2 is a block diagram illustrating a configuration of a robot according to an embodiment of the disclosure.

Referring to FIG. 2, the robot 100 according to an embodiment may include a main body 110, a drive wheel 120, a distance sensor 130, and a processor 140.

The main body 110 includes a frame of the robot 100 and various hardware included in the frame. Specifically, the main body 110 may include a frame made of a material such as plastic, metal, and the like; and a hardware module circuit-implemented on the frame. The main body 110 according to an embodiment may be implemented in the shape of a sphere, but is not limited thereto. In addition, the processor 140 may be included inside the main body 110.

The main body 110 according to an embodiment may be provided with a drive wheel formed in a structure surrounding the main body while being spaced apart from each other on both side surfaces of the main body 110, and the main body 110 may rotate based on the first shaft according to the rotation of the drive wheel 120. Here, the first shaft may correspond to a shaft in a direction perpendicular to the ground on which the robot 100 is located.

The drive wheel 120 is a device capable of driving the robot 100. The drive wheel 120 includes a driving device which rotates during driving and a driving unit which rotates the driving device. According to an embodiment, the driving device included in the drive wheel 120 may be implemented as a wheel having a shape of cutting a part of a sphere, but is not limited thereto. According to an embodiment, the driving device may be provided in the main body 110 to be rotatable based on the second shaft perpendicular to the first shaft. Here, the second shaft may correspond to a shaft perpendicular to the first shaft and parallel to the ground.

The driving unit may adjust a driving direction and a driving speed according to the control of the processor 140. The driving unit may include a power generation device (e.g., an electric motor, etc.) for generating power for driving the robot 100.

Although it has been described that the drive wheel 120 includes a driving device and a driving unit in the drive wheel 120, for convenience of description, the operation of the robot 100 will be described based on a premise that the drive wheel 120 means the driving device exposed to the outside of the robot 100. In addition, the operation of the robot 100 will be described based on a premise that the drive wheel 120 is implemented as a pair of wheels provided on both sides of the main body 110.

According to an embodiment, when a pair of wheels rotate in the same direction, the robot 100 may move straight in a predetermined direction, and when the pair of wheels rotate in the opposite direction, the robot 100 may rotate in a predetermined direction at a fixed position.

The distance sensor 130 may obtain distance information. Specifically, the distance sensor 130 may measure the distance between the location of the robot 100 and the location of the object. According to an embodiment, the distance sensor 130 may be implemented with a Light Detection And Ranging (LIDAR), a depth camera, or a Time of Flight (TOF) sensor.

According to an embodiment, the distance sensor 130 may be provided on the drive wheel 120. According to an embodiment, the distance sensor 130 may be provided at a point where the second shaft intersects a surface of the drive wheel 120. Also, the robot 100 may include a plurality of distance sensors 130.

The processor 140 controls overall operation of the robot 100. Specifically, the processor 140 may be connected to each component of the robot 100 to control overall operation of the robot 100. For example, the processor 140 may be connected to the main body 110, the drive wheel 120, and the distance sensor 130 to control the operation of the robot 100.

According to an embodiment, the processor 140 may be referred to as various names such as a digital signal processor (DSP), a microprocessor, a central processing unit (CPU), a micro controller unit (MCU), a micro processing unit (MPU), a neural processing unit (NPU), a controller, and an application processor (AP), but will be referred to as the processor 140 herein.

The processor 140 may be implemented as a system on chip (SoC) type or a large scale integration (LSI) type, or in a field programmable gate array (FPGA) type. The processor 140 may include volatile memory such as SRAM.

The processor 140 according to an embodiment of the disclosure may obtain a plurality of first distance information through at least one distance sensor 130 at a plurality of different points in which the main body 110 is located as the main body 110 is moved. For example, the plurality of different points may be points spaced apart from each other by a predetermined distance. Specifically, the processor 140 may control the pair of drive wheels to rotate in the same direction to allow the robot 100 to move in a predetermined direction, and obtain a plurality of pieces of first distance information measured several times by the distance sensor 130 at different points while the robot 100 moves in a predetermined direction.

Here, the distance information may be information on a distance to a wall surface or an object of a space sensed by one or more distance sensors 130. Hereinafter, for convenience of description, not only the obstacle included in the space but also the wall surface of the space is also represented as the term "object".

The processor 140 may obtain a plurality of second distance information through at least one distance sensor 130 in a plurality of different directions in which the main body 110 faces as the main body 110 is rotated. Specifically, the processor 140 may control the pair of drive wheels to rotate in a direction opposite to each other in order to rotate the robot 100 in a fixed direction at a fixed position, and obtain a plurality of pieces of second distance information measured in different directions by the distance sensor 130 while the robot 100 rotates in a predetermined direction.

According to an embodiment, the processor 140 may obtain information on a point where the robot 100 is located on a map corresponding to a space in which the robot 100 is located, based on the obtained first distance information and second distance information.

Here, the pair of drive wheels 120 may be provided such that the main body 110 moves in a third shaft direction perpendicular to each of the first shaft and the second shaft. Specifically, in accordance with rotating of a pair of drive wheels 120 in the opposite direction, if a first shaft about which the main body 110 rotates is a Z shaft, and a second shaft about which each of the pair of drive wheels 120 rotates is referred to as a Y shaft, the drive wheels 120 may be provided so that the robot 100 may move in the X shaft direction.

Also, the distance sensor 130 according to an embodiment may include a first distance sensor disposed in a first region of the main body 110 adjacent to the first drive wheel among a pair of drive wheels; and a second distance sensor disposed in a second region of the main body 110 adjacent to the second drive wheel. Specifically, the distance sensor 130 may be provided at two points where the second shaft intersects with the surface of the pair of drive wheels.

Here, the first distance sensor and the second distance sensor according to an embodiment may be implemented as a time of flight (TOF) sensor. The TOF sensor may include a light emitting unit and a light receiving unit. A light receiving unit included in the TOF sensor may detect that the light irradiated from the light emitting unit is reflected by an object. The processor 140 may identify a distance from the sensor to the object based on a time elapsed until the light irradiated from the light emitting unit is received at the light receiving unit.

Here, the light receiving unit according to an embodiment may be implemented in the form of a 2D array having an M*N arrangement. In addition, the sensing range (or angle of view) of the ToF sensor may be arbitrarily set by the user of a manufacturer and a user of the robot 100, but in the case of the robot 100 disclosed in the present specification, a ToF sensor having a narrow sensing range may be provided to enhance a function of identifying a distance from the sensor to the object.

The robot 100 according to one example may further include a tilt sensor. Here, the tilt sensor is a sensor capable of detecting whether the robot 100 is tilted in a specific direction, and the tilt sensor according to an embodiment may be implemented by a gyro sensor.

According to an embodiment, the processor 140 may obtain information on a point where the main body 110 is located on a map based on the remaining distance information except for the obtained distance information when tilt information obtained by a tilt sensor among a plurality of first distance information and a plurality of second distance information is greater than or equal to a threshold tilt in a specific shaft direction.

The robot 100 according to one example may be implemented as a small robot having the main body 110 having a spherical shape less than or equal to a threshold size. In this case, the pair of drive wheels 120 may be spaced apart from each other to surround the main body from the outside of the spherical main body 110.

Here, a map corresponding to a space in which the robot 100 is located may include distance information corresponding to each of a plurality of points on the map. Specifically, the map may include information on whether an object is located at a coordinate corresponding to each point of a space in which the robot 100 is located, and information on a distance from each coordinate to an object located in a predetermined direction from the corresponding coordinate.

According to an example, the processor 140 may obtain third distance information based on the radius, the first distance information, and second distance information of the main body 110.

When the main body 110 of the robot 100 has a spherical shape having a predetermined diameter, a coordinate corresponding to the center of the robot 100, that is, a distance from the location of the robot 100 to the object is a value obtained by adding the radius of the main body 110 to the distance from each distance sensor to the object. Accordingly, the third distance information may include information on the distance from the location of the robot 100 to the object.

The processor 140 may identify distance information matching the third distance information among the distance information included in the map, and identify a point corresponding to the identified distance information as a point where the robot 100 is located. A specific operation of the robot 100 related thereto will be described in detail with reference to FIGS. 7A and 7B.

A map corresponding to a space in which the robot 100 is located may include distance information based on specifications of the robot 100, such as the diameter of the robot 100 or the arrangement of the distance sensor. Specifically, the map may include information on the distance from the distance sensor 130 to the object provided when the robot 100 located at a specific coordinate is oriented in a predetermined direction.

In this case, the processor 140 may identify distance information matching the first distance information and the second distance information among the distance information included in the map, and identify a point corresponding to the identified distance information as a point where the robot 100 is located.

Here, the processor 140 according to an embodiment may update distance information on a map based on distance information acquired through the at least one distance sensor 130 when the distance information corresponding to the point where the robot 100 is located on the map and the distance information acquired through the at least one distance sensor 130 at the corresponding point is at least partially different.

Here, the distance information update means updating information on the distance from the distance sensor 130 provided in the robot 100 to the object when the robot is oriented in a predetermined direction at a point where the robot is located. A distance information update operation of the robot 100 will be described in detail with reference to FIG. 8.

Figure 3A:
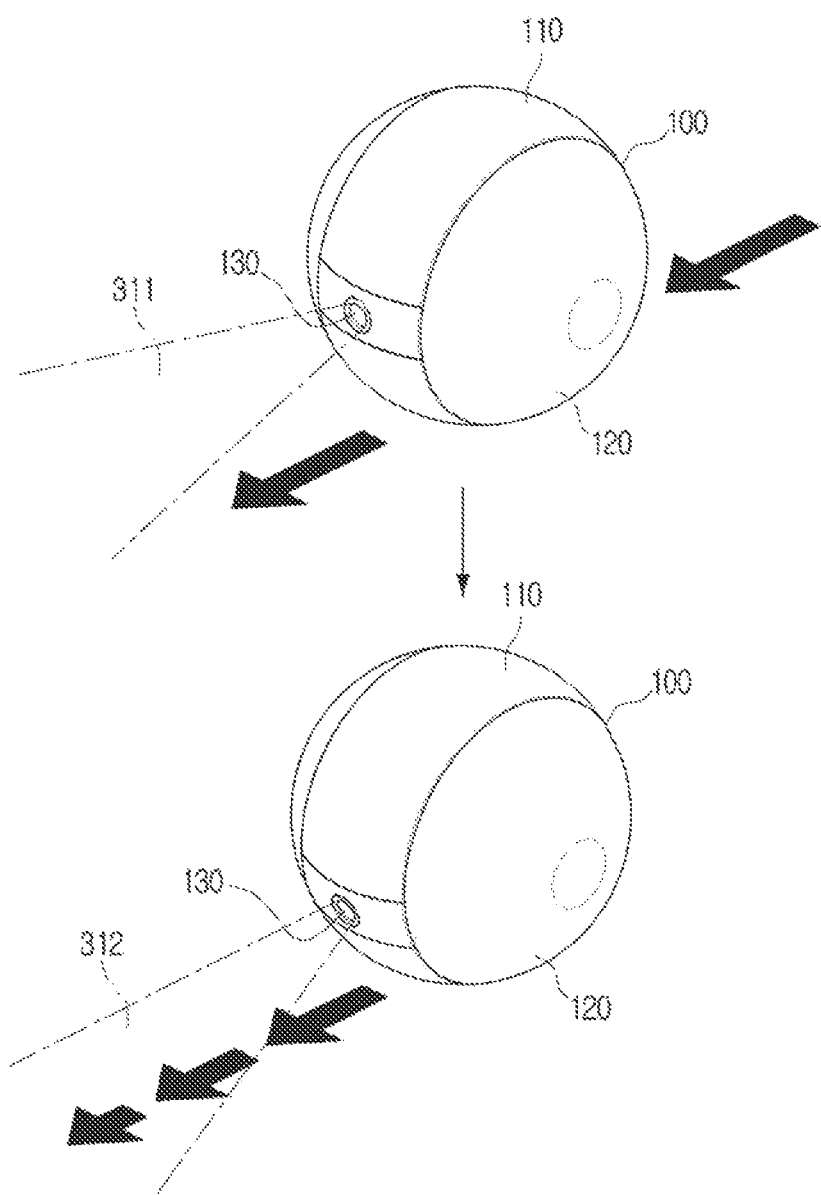
FIGS. 3A and 3B are diagrams illustrating a sensing range according to a location where a distance sensor of a robot is provided.

FIG. 3A is a diagram illustrating a change in a sensing range when the distance sensor 130 is provided to sense a moving direction of the robot 100. The distance sensor 130 needs to sense an object distributed in a region on a Z shaft in which the robot 100 is located, in order for the robot 100 to acquire data required for driving.

Referring to FIG. 3A, a robot 100 may include the distance sensor 130 provided on the main body 110 and configured to sense a moving direction of the robot 100. The sensing range 311 of the distance sensor 130 is formed in the moving direction of the robot if the robot 100 is moving at a constant speed, and the robot 100 may detect an object distributed in an area on the Z shaft where the robot 100 is located by the distance sensor 130.

However, when the robot 100 performs a deceleration operation, the sensing range 312 of the distance sensor 130 is lowered toward the ground as the main body 110 is tilted. In this case, the distance information acquired by the distance sensor 130 is information on the distance from the distance sensor 130 to the ground, and thus the robot 100 may not detect an object distributed in an area on the Z shaft in which the robot 100 is located.

This may occur even when the robot 100 performs an acceleration operation in a stopped state. Since a sensing range of a distance sensor 130 rises toward a ceiling, the robot 100 performing an acceleration operation may not detect an object. In addition, the sensing range of the distance sensor 130 may be changed according to the tilt of the ground in addition to the deceleration and acceleration operation of the robot 100.

Figure 3B:
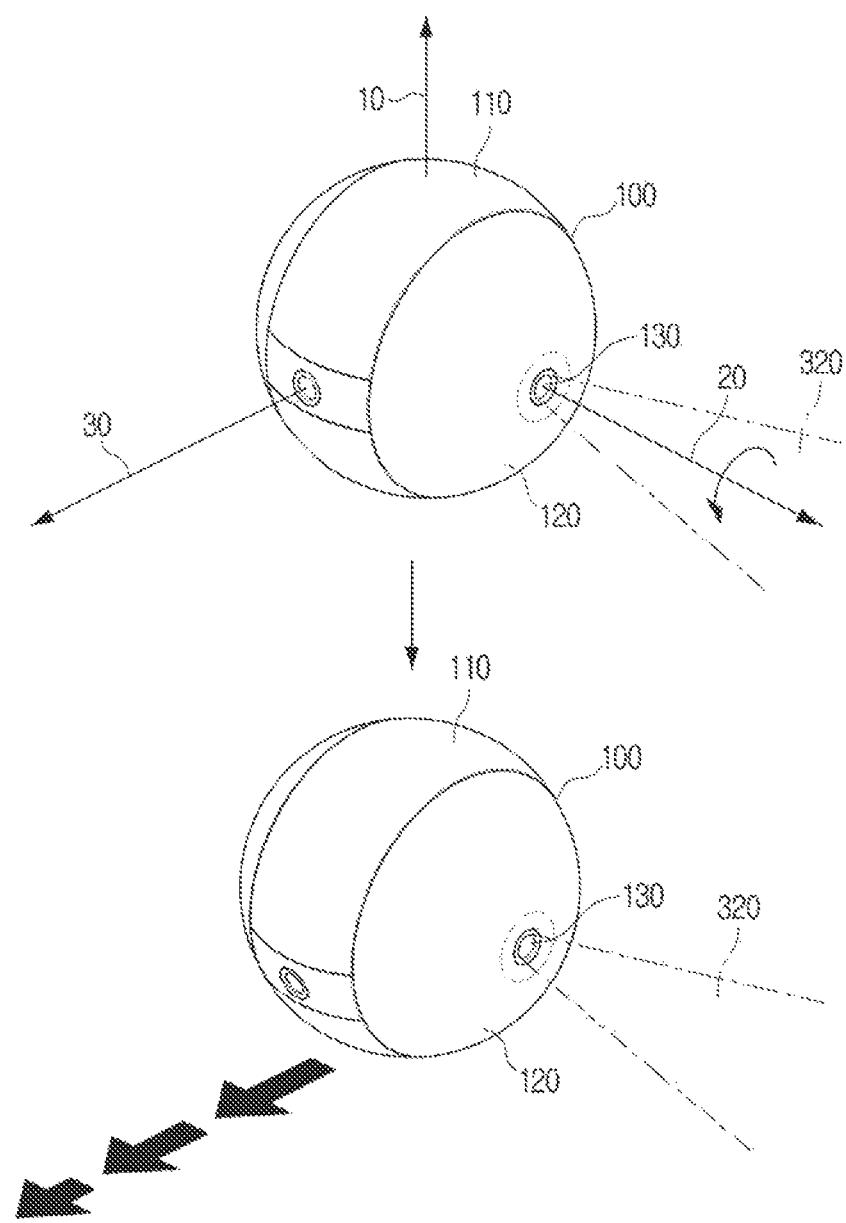

FIG. 3B is a diagram illustrating a sensing range of the distance sensor 130 when the distance sensor 130 is provided in the rotating shaft of the drive wheel 120.

Referring to FIG. 3B, a Z shaft 10 perpendicular to the ground, a Y shaft 20 that is a rotating shaft of the drive wheel 120, and an X shaft 30 that matches the moving direction of the robot 100 are shown. The distance sensor 130 according to an embodiment of the disclosure may be provided on the Y shaft 20, which is a rotating shaft of the drive wheel 120.

In this disclosure, the term headed direction of the robot 100 or the main body 110 may be used to have the same meaning as the X shaft 30 having the same moving direction with the robot 100.

The sensing range 320 of the distance sensor 130 may be formed over an area within a threshold range around the Y shaft 20, and the robot 100 may detect an object distributed in an area on the Z shaft in which the robot 100 is located by the distance sensor 130.

The robot 100 according to an embodiment of the disclosure does not change the sensing range 320 of the distance sensor 130 despite deceleration or acceleration operation, and thus may detect an object distributed in a region on the Z shaft in which the robot 100 is located.

Figure 4:
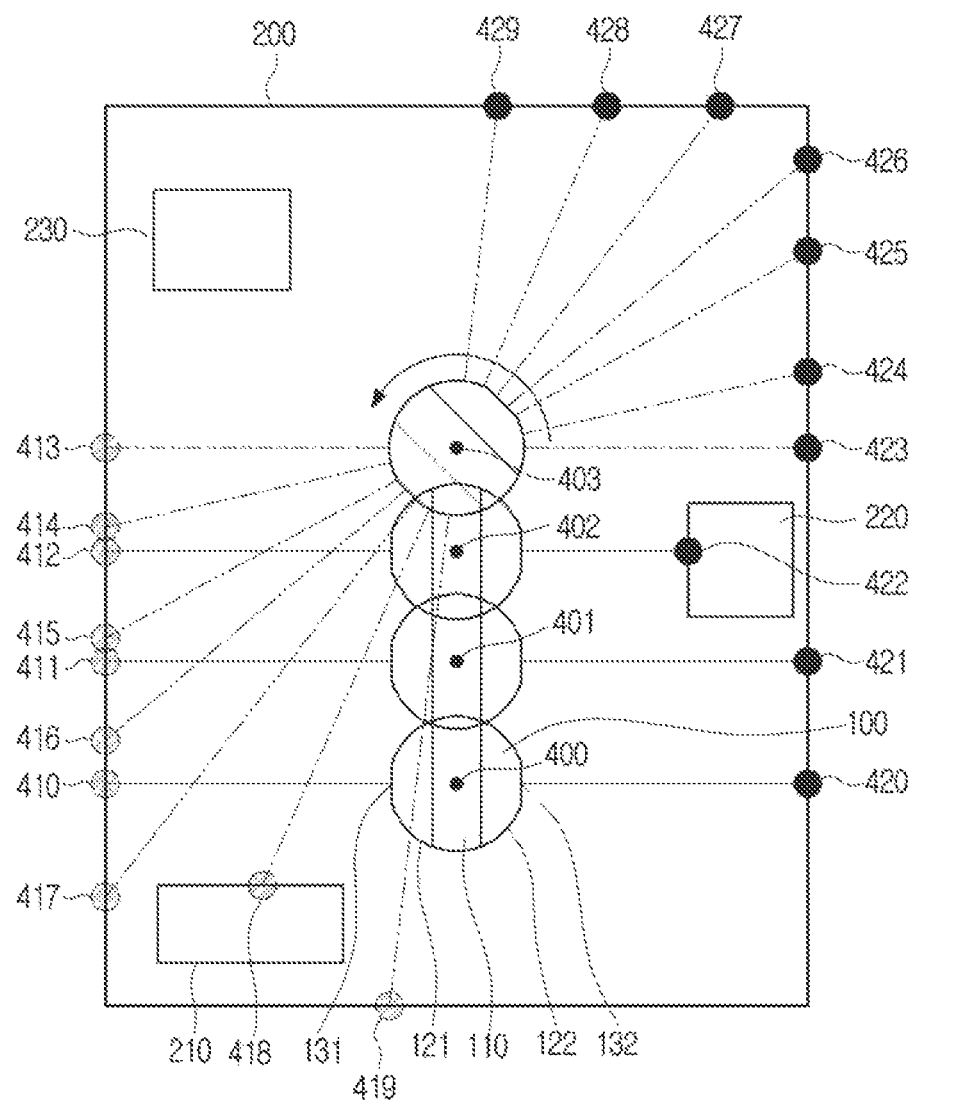
FIG. 4 is a diagram illustrating acquiring distance information according to moving and rotation operations of a robot according to an embodiment of the disclosure.

FIG. 4 is a floor plan illustrating acquiring distance information of the robot 100 and the indoor space 200 according to moving and rotation operations of a robot according to an embodiment of the disclosure.

The distance sensor 130 according to an embodiment of the disclosure may include the first distance sensor 131 disposed in a first area of the main body 110 adjacent to a first drive wheel 121 among a pair of drive wheels; and the second distance sensor 132 disposed in a second area of the main body 110 adjacent to a second drive wheel 122 among the pair of drive wheels. Here, the first and second distance sensors 131, 132 according to an embodiment may be implemented by a ToF sensor.

According to an embodiment, the robot 100 may move or rotate the main body 110 to obtain information on objects distributed at various positions in the space 200, and the robot 100 may improve the range and accuracy of object sensing by acquiring distance information measured in a plurality of different points or directions through the distance sensor 130 while the main body 110 moves or rotates.

The operation of the above robot 100 is described in detail below. First, the robot 100 traveling in an indoor space 200 is illustrated in FIG. 4. The robot 100 may start from the lower end portion of FIG. 4 to the upper end portion of FIG. 4. In this case, as the main body 110 is moved, the robot 100 may acquire a plurality of first distance information (410 to 413, 420 to 423) through the first and second distance sensors 131, 132 at a plurality of different points where the main body 110 is located.

The robot 100 may obtain distance information 410 for an object through the first distance sensor 131 at an initial position 400 and distance information 420 for an object through the second distance sensor 132. Then, the robot 100 may acquire the distance information 411, 412, 413 for the plurality of objects by the first distance sensor 131 and the distance information 421, 422, 423 for the plurality of objects through the second distance sensor 132 until reaching the final position 403 of the robot 100.

According to an embodiment, the distance information 422 obtained by the second distance sensor 132 at a specific point 402 when the main body 110 is moved may include information on the distance from the robot 100 to the obstacle 220 located in the indoor space 200.

In addition, the robot 100 may rotate counterclockwise at a final position 403. In this case, the robot 100 may obtain a plurality of second distance information (414 to 419, 424 to 429) through the first and second distance sensors 131, 132 in a plurality of different directions toward the main body 110 as the main body 110 is rotated. In FIG. 4, the direction in which the main body 110 is headed may be perpendicular to a straight line connecting the first and second distance sensors 131 and 132, and may be a direction of a straight line parallel to the ground.

The robot 100 may obtain distance information 414 for an object through the first distance sensor 131 in an initial direction and distance information 424 for an object through a second distance sensor 132. The robot 100 may acquire distance information (415 to 419) for the plurality of objects by the first distance sensor 131 and distance information (425 to 429) for the plurality of objects through the second distance sensor 132 until reaching the final direction of the robot 100.

According to an embodiment, the distance information 418 obtained by the first distance sensor 131 in a specific direction as the main body 110 is rotated may include information on the distance from the robot 100 to the obstacle 210 located in the indoor space 200.

The robot 100 according to an embodiment may identify the location of the robot 100 based on the acquired first distance information (410 to 419), second distance information (420 to 429), and distance information corresponding to each of a plurality of points on the map of the indoor space 200.

FIG. 4 illustrates four times of distance information acquisition when the robot 100 moves in one direction, six times of distance information acquisition when the robot is rotated in one direction at a fixed position, but the period or frequency of acquiring the distance information may be changed, unlike the description shown in FIG. 4.

Figure 5A:
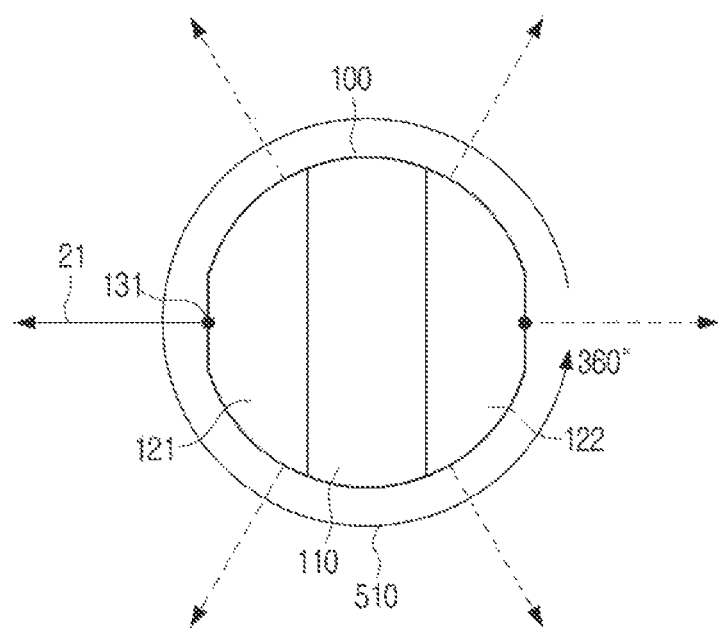
FIGS. 5A and 5B are diagrams illustrating a rotation operation of a robot according to a number of distance sensors according to an embodiment of the disclosure.
Figure 5B:
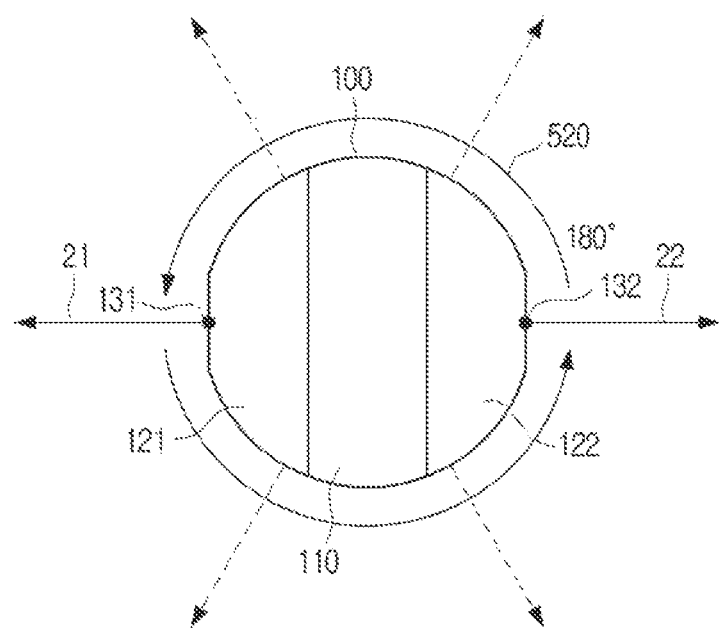

FIGS. 5A and 5B are diagrams illustrating a rotation operation of a robot according to a number of distance sensors according to an embodiment of the disclosure.

The robot 100 according to an embodiment of the disclosure may acquire a plurality of distance information through at least one distance sensor in a plurality of different directions in which the main body 100 faces as the main body 100 rotates.

Referring to FIG. 5A, the robot 100 according to an embodiment may include the first distance sensor 131 disposed in a region of the main body 110 adjacent to the first drive wheel 121 among a pair of drive wheels. The robot 100 may acquire a plurality of distance information through the first distance sensor 131 in a plurality of different directions in which the main body 110 is headed as the main body 110 rotates 360 degrees 510.

Specifically, the robot 100 may obtain distance information corresponding to a sensing range 21 of the first distance sensor 131 at every preset period while the main body 110 rotates. Since the direction in which the robot 100 is headed is the direction of an X shaft (not shown) corresponding to the moving direction of the robot, the robot 100 may acquire distance information corresponding to the direction 21 perpendicular with the headed direction and parallel to the ground.

In FIG. 5A, it is illustrated that the distance information is acquired by the robot 100 for a total of six times whenever the main body 110 rotates at an angle of 60 degrees, but period or frequency of distance information acquisition may be set differently.

Referring to FIG. 5B, the robot 100 according to an embodiment may include the first distance sensor 131 disposed in one area of the main body 110 adjacent to the first drive wheel 121 among the pair of drive wheels and the second distance sensor 132 disposed in one area of the main body 110 adjacent to the second drive wheel 122.

The robot 100 may obtain a plurality of distance information through the first distance sensor 131 and the second distance sensor 132 in a plurality of different directions headed by the main body 110, as the main body 110 rotates by 180 degrees (520).

Specifically, the robot 100 may obtain distance information corresponding to the sensing range 21 of the first distance sensor and the sensing range 22 of the second distance sensor every preset period while the main body 110 rotates.

As shown in FIGS. 5A and 5B, when the robot 100 includes two distance sensors 131 and 132 on the first drive wheel 121 and the second drive wheel 122, it is possible to acquire the same amount of distance information by slightly rotating the main body 110 than when the robot 100 is provided with one distance sensor 131.

Figure 6:
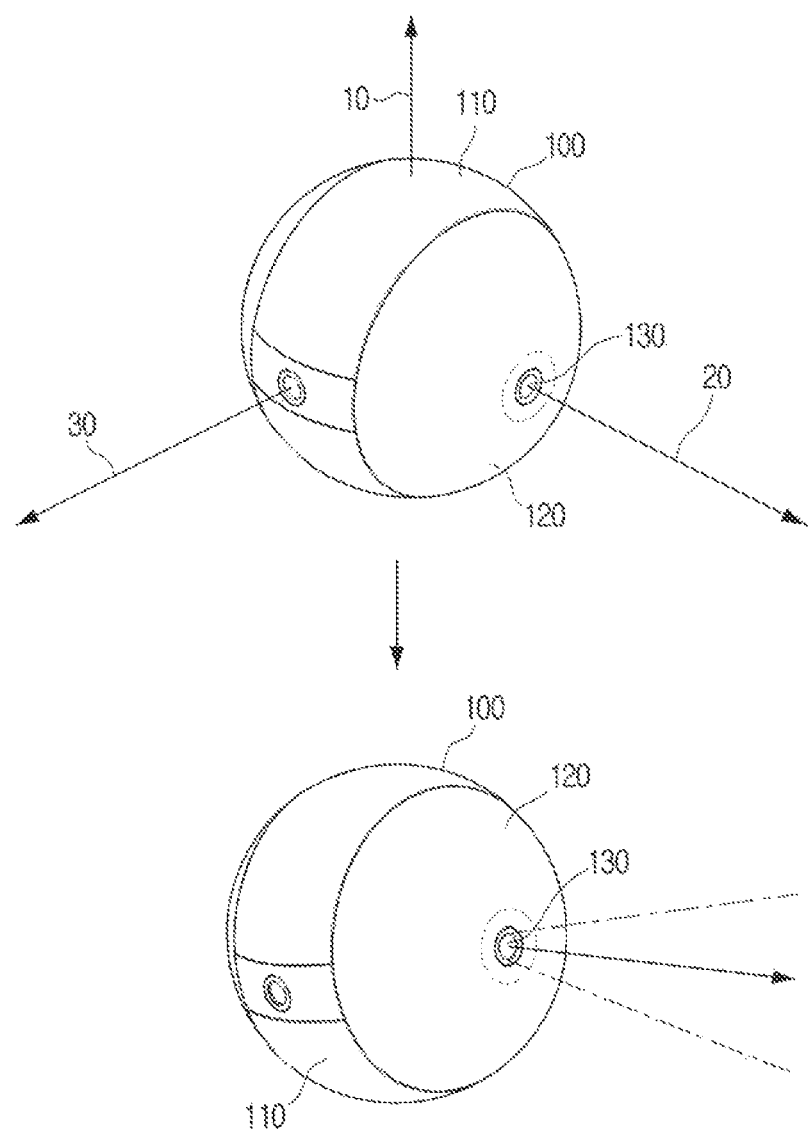
FIG. 6 is a diagram illustrating acquiring distance information when a robot is tilted in a specific direction according to an embodiment of the disclosure.

FIG. 6 is a diagram illustrating acquiring distance information when a robot is tilted in a specific direction according to an embodiment of the disclosure.

The robot 100 according to an embodiment may further include a tilt sensor (not shown). The robot 100 may obtain information (hereinafter, tilt information) about whether the main body 110 is tilted in a specific direction through a tilt sensor. The tilt sensor according to an example may be implemented as a gyro sensor.

The robot 100 may obtain whether the robot 100 is rotated based on the third shaft 30 corresponding to the advancing direction of the robot through the tilt sensor 130.

When the main body 110 rotates based on the first shaft 10 or the second shaft 20, an object distributed in an area on the first shaft 10 in which the robot 100 is located is included in the sensing range of the distance sensor 130, but when the main body 110 rotates based on the third shaft 30, the sensing range of the distance sensor 130 may be distorted in the direction of the ground or the ceiling.

Accordingly, the robot 100 may obtain information on a point where the main body 110 is located on the map, based on the remaining distance information excluding the acquired distance information when the tilt information acquired by the tilt sensor is greater than or equal to the threshold tilt in the direction of the third shaft 30.

Accordingly, the robot 100 may obtain reliable distance information despite the distortion of the sensing range which cannot be prevented even if the distance sensor 130 is provided on the rotating shaft 20 of the drive wheel 120.

Figure 7A:
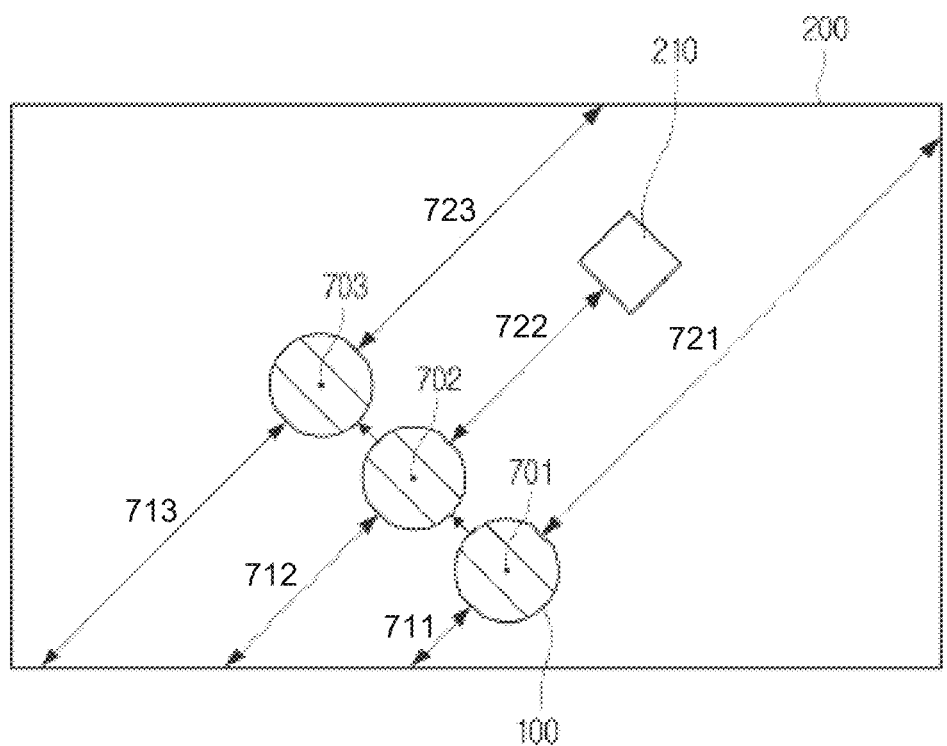
FIGS. 7A and 7B are diagrams illustrating a location identification method based on distance information acquired according to moving or rotation operations of the robot according to an embodiment of the disclosure.
Figure 7B:
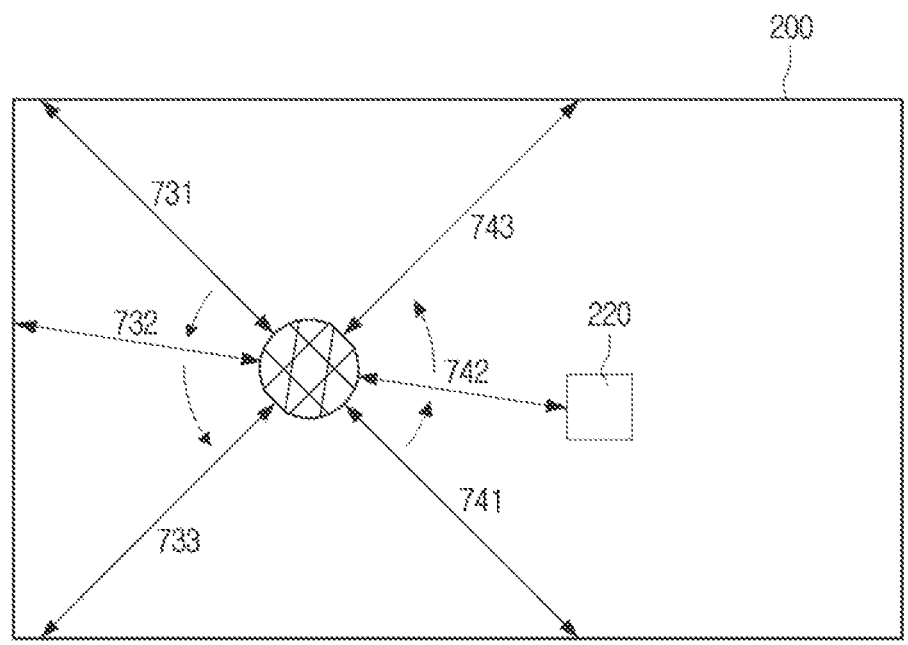

FIGS. 7A and 7B are diagrams illustrating a location identification method based on distance information acquired according to moving or rotation operations of the robot according to an embodiment of the disclosure.

Referring to FIG. 7A, the robot 100 according to an embodiment of the disclosure may include the first distance sensor 131 and the second distance sensor 132. The robot 100 may obtain distance information (711, 712, 713) sensed by the first distance sensor 131 and distance information (721, 722, 723) sensed by the second distance sensor 132 from the initial position (701) to the final position (703) of the main body 110.

Here, as the main body 110 moves, the distance information 722 obtained by the second distance sensor 132 at a specific point 702 may include information on the distance from the robot 100 to the obstacle 210 located in the indoor space 200.

The robot 100 may identify the location of the robot 100 based on the acquired distance information and distance information included in the map corresponding to the space 200. Specifically, when the wall surface of the space 200 is arranged in a rectangular structure, the robot 100 may identify an angle between a moving direction of the robot 100 and each wall surface of the space 200 based on distance information which corresponds to a section in which the sum of distance sensed by the first distance sensor 131 and the distance sensed by the second distance sensor 131 is constant and the moving speed of the robot.

For example, the sum of the distance sensed by the first distance sensor 131 and the distance sensed by the second distance sensor 132 is constant from the time immediately after identifying the obstacle 210 by the robot 100 until the time when the robot reaches at the final position 703. Therefore the robot 100 may identify the angle between the moving direction of the robot 100 and each wall of the space 200 based on the distance information corresponding to the section and the speed of the robot 100.

In addition, the robot 100 may identify the edge of the wall surface sensed by the distance sensor. According to an embodiment, when the robot 100 moves at an initial position 701, the distance sensed by the second distance sensor 132 may increase and then decrease. Specifically, the distance sensed by the second distance sensor 132 may increase before a point in time at which the edge of the upper right end of the space 200 is included within the sensing range, and then may decrease after the point in time. Accordingly, the robot 100 may identify the corner of the wall surface of the space 200.

The robot 100 may identify the location of the robot 100 based on the identified angle, the corner, and the location information of the obstacle 210 included in the map.

Referring to FIG. 7B, the robot 100 according to an embodiment of the disclosure may control the drive wheel 120 such that the main body 110 rotates in a counterclockwise direction. The robot 100 may obtain distance information (731, 732, 733) sensed by the first distance sensor 131 and distance information (741, 742, 743) sensed by the second distance sensor 132 as the main body 110 is rotated.

Here, as the main body 110 rotates, the distance information 742 acquired by the second distance sensor 132 in a specific direction may include information on the distance from the robot 100 to the obstacle 220 located in the indoor space 200.

The robot 100 may identify the location of the robot 100 based on the acquired distance information, a specific coordinate in the space 200 included in a map and the information on a distance which is from the distance sensor of the robot 100 located at the corresponding specific coordinate to an object located in a predetermined direction.

According to an embodiment of the disclosure, there is an advantage in that the robot 100 may be produced at a low cost since there is no need to have a device such as a GPS or an IMU to identify the location of the robot 100. In addition, since the position of the robot 100 may be identified without a compensation algorithm for deceleration or acceleration of the robot 100, the amount of operation of the processor 140 may be reduced.

Figure 8:
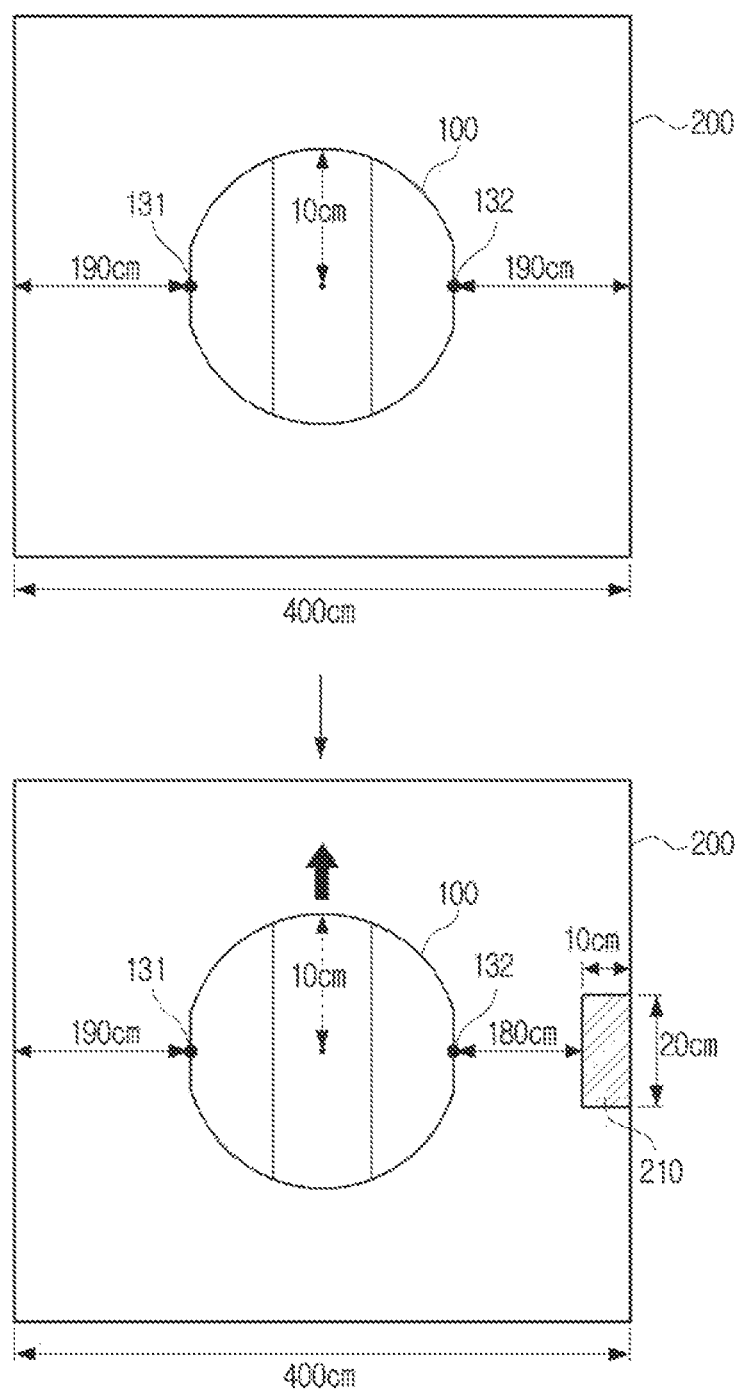
FIG. 8 is a diagram illustrating a method of updating distance information on a map of a robot according to an embodiment of the disclosure.

FIG. 8 is a diagram illustrating a method of updating distance information on a map of a robot according to an embodiment of the disclosure.

Referring to FIG. 8, the space 200 may have a rectangular shape having a horizontal length of 400 cm. The robot 100 according to an embodiment may include a spherical main body 110 having a radius of 10 cm. The robot 100 may obtain distance information between the center position of the robot 100 and the object based on the radius of the main body 110, the first distance sensor 131, and the distance information acquired by the second distance sensor 132.

According to an embodiment, the robot 100 may identify 200 cm, which is the distance 190 cm sensed by the first distance sensor 131, plus 10 cm, which is the radius of the main body 110, to be a distance between the center position of the robot 100 and the left wall of the space 200. In addition, the robot 100 may identify 200 cm, which is the distance 190 cm sensed by the second distance sensor 132, plus 10 cm, which is the radius of the main body 110, to be the distance between the center position of the robot 100 and the right wall of the space 200.

In this example, the robot 100 may identify a point corresponding to distance information matching the identified distance information among the distance information included in the map as a point at which the robot 100 is located.

The map corresponding to the space 200 needs to be updated when an obstacle is newly placed in the space 200 or the position of the obstacle in which the obstacle is placed is changed. Referring to FIG. 8, when an obstacle 210 having a rectangular shape with a width of 10 cm and a length of 20 cm is located on a right wall surface of a space 200, the robot 100 may update a map based on distance information about the corresponding obstacle 210.

Specifically, as the main body 110 moves in a direction perpendicular to the horizontal wall surface of the space 200, if the distance sensed by the second distance sensor 132 is identified as 180 cm in a specific section, the robot 100 may identify that the distance information acquired through the second distance sensor 132 is different from the distance information corresponding to the section on the map and may identify that the obstacle 210 is located in the section.

Specifically, the robot 100 may identify that the distance sensed by the second distance sensor 132 is 180 cm in a section corresponding to 20 cm, which is the longitudinal length of the obstacle 210, identify that the obstacle 210 having the width of 10 cm is located in the corresponding section, and update the distance information on the map based on the identified distance.

Figure 9:
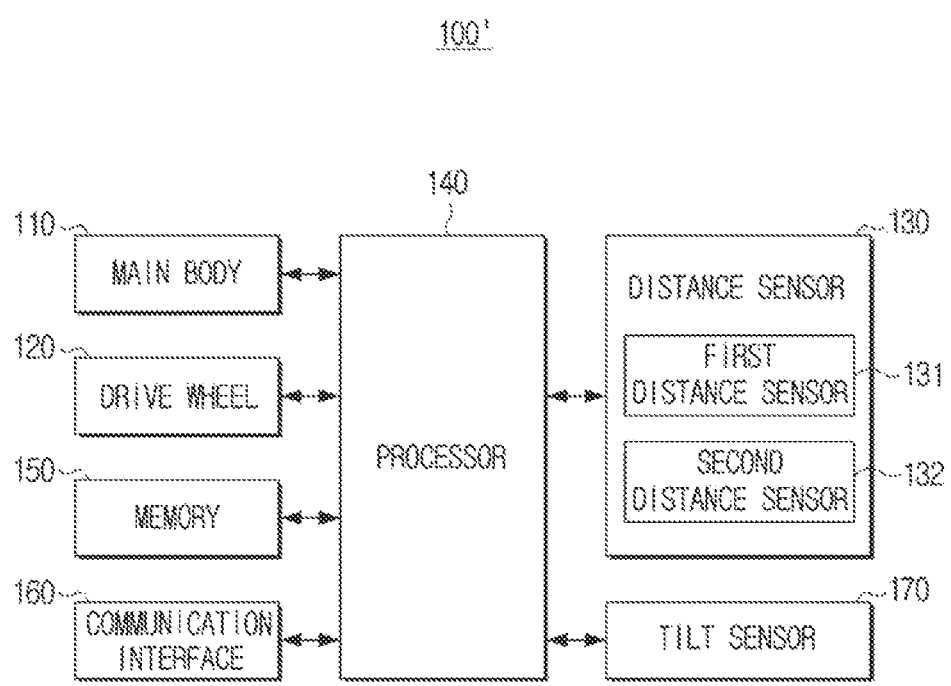
FIG. 9 is a block diagram specifically illustrating a functional configuration according to an embodiment of the disclosure.

FIG. 9 is a block diagram specifically illustrating a functional configuration according to an embodiment of the disclosure.

According to FIG. 9, a robot 100' includes the main body 110, the drive wheel 120, the distance sensor 130, the processor 140, a memory 150, a communication interface 160, and a tilt sensor 170. In the configuration illustrated in FIG. 9, a detailed description of a configuration overlapping with the configuration shown in FIG. 2 will be omitted.

The distance sensor 130 may include the first distance sensor 131 and the second distance sensor 132. According to an embodiment, the first distance sensor 131 and the second distance sensor 132 may sense objects located in opposite directions.

The memory 150 may store data necessary for various embodiments of the disclosure. The memory 150 may be implemented as a memory embedded in the robot 100', or may be implemented as a removable or modular memory in the robot 100', according to the data usage purpose. For example, data for driving the robot 100' may be stored in a memory embedded in the robot 100', and data for an additional function of the electronic robot 100' may be stored in the memory detachable to the robot 100'. A memory embedded in the robot 100' may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), or the like. In the case of a memory detachably mounted to the robot 100', the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like, but the memory is not limited thereto.

According to an embodiment, the memory 150 may store a map corresponding to a space in which the robot 100' is located.

The communication interface 160 may input and output various types of data. For example, the communication interface 160 may receive transmit or receive various types of data from an external device (for example, a source device), an external storage medium (for example, a universal serial bus (USB) memory), an external server (for example, a web hard) through communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or the like.

According to an example, the robot 100' may download a map stored in the external server through the communication interface 160.

Figure 10:
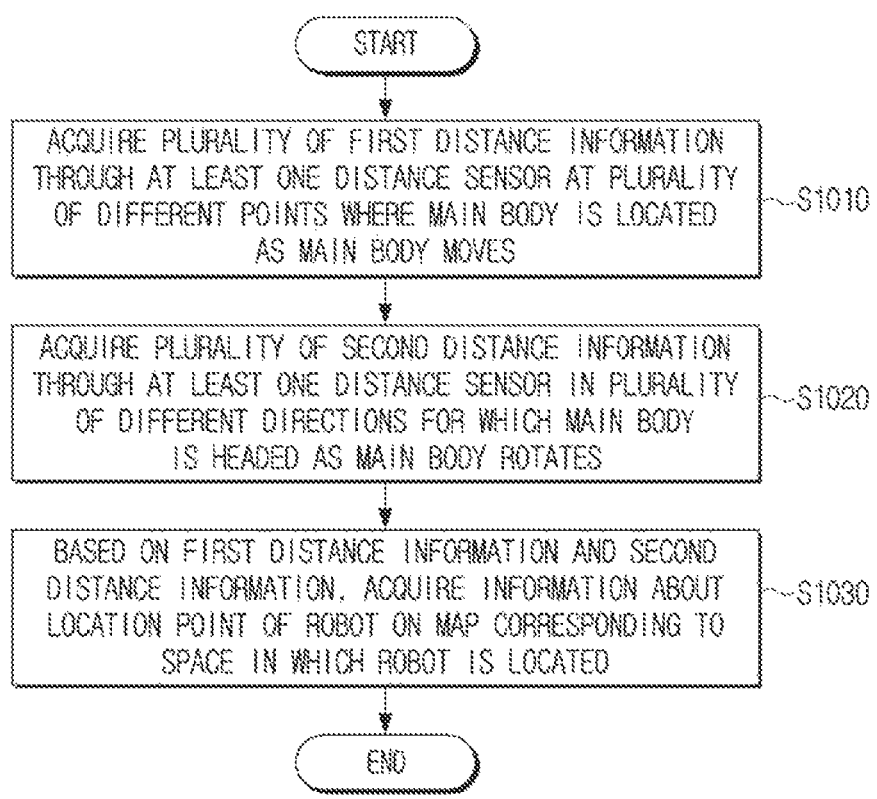
FIG. 10 is a flowchart illustrating a method of controlling according to an embodiment of the disclosure.

FIG. 10 is a flowchart illustrating a method of controlling according to an embodiment of the disclosure.

According to an embodiment, a method of controlling a robot comprising a main body rotatable about a first shaft and a pair of drive wheels provided in the main body to be rotatable about a second shaft perpendicular to the first shaft may include acquiring a plurality of first distance information through the at least one distance sensor at a plurality of different points where the main body is located as the main body moves in operation S1010. The method may include acquiring a plurality of second distance information through the at least one distance sensor in a plurality of different directions for which the main body is headed as the main body rotate in operation S1020. The method may include acquiring information about a location point of the robot on a map corresponding to a space in which the robot is located based on the first distance information and the second distance information in operation S1030.

The at least one distance sensor may include a first distance sensor disposed in a first area of the main body adjacent to a first drive wheel of the pair of drive wheels, and a second distance sensor disposed in a second area of the main body adjacent to a second drive wheel of the pair of drive wheels.

The first distance sensor and the second distance sensor may be implemented with a time of flight (ToF) sensor.

The acquiring information about a point where the robot is located in operation S1030 may include, based on tilt information obtained by the tilt sensor between the plurality of first distance information and the plurality of second distance information being greater than or equal to a threshold tilt in a direction of a specific shaft, acquiring information about a point where the main body is located on the map based on remaining distance information excluding acquired distance information.

The main body may be a spherical shape of a size less than or equal to a threshold size, and the pair of drive wheels may be spaced apart from each other and provided to surround the main body in an outer side of the spherical main body.

Here, the map includes distance information corresponding to each of a plurality of points on the map, and acquiring information about a point where the robot is located in operation S1030 may include acquiring third distance information based on the diameter of the main body, the first distance information, and the second distance information; and identifying distance information matching the third distance information from among the distance information included in the map, and identifying a point corresponding to the identified distance information as a point at which the robot is located.

The map may include distance information corresponding to each of a plurality of points on the map, and acquiring information about a point at which the robot is located in operation S1030 may include identifying distance information matching the first distance information and the second distance information among the distance information included in the map, and identifying a point corresponding to the identified distance information as a point at which the robot is located.

The method may further include updating distance information on the map based on distance information corresponding to a point at which the robot is located on the map and distance information acquired through the at least one distance sensor when at least some distance information acquired through the at least one distance sensor at the corresponding point is at least partially different.

The methods according to various embodiments may be implemented as a format of application installable to a related art robot.

The methods according to various embodiments may be implemented by software upgrade of a related art robot, or hardware upgrade only.

The various embodiments may be performed through an embedded server provided in the robot or at least one external server.

The various embodiments described above may be implemented in a recordable medium which is readable by a computer or a device similar to the computer using software, hardware, or the combination of software and hardware. In some cases, embodiments described herein may be implemented by the processor 140 itself. According to a software implementation, embodiments such as the procedures and functions described herein may be implemented with separate software modules. Each of the software modules may perform one or more of the functions and operations described herein.

According to various embodiments described above, computer instructions for performing processing operations of the robot 100 according to the various embodiments described above may be stored in a non-transitory computer-readable medium. The computer instructions stored in the non-transitory computer-readable medium may cause a particular device to perform processing operations on the robot 100 according to the various embodiments described above when executed by the processor of the particular device.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

According to one or more embodiments of the disclosure, a location of a robot may be accurately identified in a space by using highly reliable distance information acquired based on a plurality of directions in various situations occurring during a driving process of the robot.

While embodiments of the disclosure have been shown and described, the disclosure is not limited to the aforementioned specific embodiments, and it is apparent that various modifications may be made by those having ordinary skill in the technical field to which the disclosure belongs, without departing from the scope of the disclosure as claimed by the appended claims. Also, it is intended that such modifications are not to be interpreted independently from the technical idea or prospect of the disclosure.

What is claimed is:
1. A robot comprising:
a first shaft;
a main body rotatable about the first shaft;
a first drive wheel and a second drive wheel provided in the main body to be rotatable about a second shaft that is perpendicular to the first shaft;
at least one distance sensor provided on the second shaft;
memory storing instructions; and
at least one processor configured to execute the instructions,
wherein the instructions, when executed by the at least one processor, cause the robot to:
acquire first distance information through the at least one distance sensor at each of a plurality of different points at which the main body is located as the main body moves;
acquire second distance information through the at least one distance sensor in each of a plurality of different directions in which the main body is directed as the main body rotates; and
acquire, based on the first distance information and the second distance information, information about a location point of the robot on a map corresponding to a space in which the robot is located,
wherein the at least one distance sensor comprises:
a first distance sensor disposed in a first area of the main body adjacent to the first drive wheel; and
a second distance sensor disposed in a second area of the main body adjacent to the second drive wheel,
wherein the first distance sensor is configured to acquire the first distance information, and
wherein the second distance sensor is configured to acquire the second distance information in an opposite direction to the first distance information acquired by the first distance sensor while the main body rotates around the first shaft.

2. The robot of claim 1, wherein the robot comprises a third shaft, and
wherein the first drive wheel and the second drive wheel are configured so that the main body moves in a direction of the third shaft that is perpendicular to each of the first shaft and the second shaft.

3. The robot of claim 1, wherein each of the first distance sensor and the second distance sensor comprises a time of flight (ToF) sensor.

4. The robot of claim 1, further comprising:
a tilt sensor,
wherein the instructions, when executed by the at least one processor, cause the robot to:
acquire information about the location point at which the main body is located on the map based on third distance information excluding acquired fourth distance information, and
wherein the fourth distance information is acquired based on tilt information, which is obtained by the tilt sensor from the first distance information and the second distance information, being greater than or equal to a threshold tilt in a direction of a specific shaft.

5. The robot of claim 1, wherein the main body has a spherical shape, and
wherein the first drive wheel and the second drive wheel are spaced apart from each other and surround the main body in an outer side of the main body.

6. The robot of claim 5, wherein the map comprises map distance information corresponding to each of a plurality of points on the map, and
wherein the instructions, when executed by the at least one processor, cause the robot to:
acquire third distance information based on a diameter of the main body, the first distance information, and the second distance information,
identify fourth distance information corresponding to the third distance information from among the map distance information included in the map; and
identify a point corresponding to the fourth distance information as the location point at which the robot is located.

7. The robot of claim 1, wherein the map comprises map distance information corresponding to each of a plurality of points on the map, and
wherein the instructions, when executed by the at least one processor, cause the robot to identify third distance information matching the first distance information and the second distance information from among the map distance information included in the map, and identify a point corresponding to the third distance information as the location point at which the robot is located on the map.

8. The robot of claim 7, wherein the instructions, when executed by the at least one processor, cause the robot to, based on the third distance information corresponding to the location point at which the robot is located on the map and fourth distance information obtained through the at least one distance sensor at the point being different, update the map distance information on the map based on the fourth distance information obtained through the at least one distance sensor.

9. A method of controlling a robot comprising a main body rotatable about a first shaft, and a first drive wheel and a second drive wheel that are provided in the main body to be rotatable about a second shaft that is perpendicular to the first shaft, the method comprising:
acquiring first distance information through at least one distance sensor at each of a plurality of different points at which the main body is located as the main body moves;
acquiring second distance information through the at least one distance sensor in each of a plurality of different directions in which the main body is directed as the main body rotates;
acquiring, based on the first distance information and the second distance information, information about a location point of the robot on a map corresponding to a space in which the robot is located; and
controlling the first drive wheel and the second drive wheel of the robot based on the first distance information and the second distance information,
wherein the at least one distance sensor comprises a first distance sensor disposed in a first area of the main body adjacent to the first drive wheel, and a second distance sensor disposed in a second area of the main body adjacent to the second drive wheel, and
wherein the acquiring the first distance information comprises acquiring the first distance information in opposite directions using the first distance sensor and the second distance sensor while the main body rotates around the first shaft.

10. The method of claim 9, wherein the robot comprises a third shaft and wherein the first drive wheel and the second drive wheel are configured so that the main body moves in a direction of the third shaft that is perpendicular to each of the first shaft and the second shaft.

11. The method of claim 9, wherein each of the first distance sensor and the second distance sensor comprise a time of flight (ToF) sensor.

12. The method of claim 9, wherein the acquiring information about the location point at which the robot is located comprises acquiring information about a point at which the main body is located on the map based on third distance information excluding acquired fourth distance information, and
wherein the fourth distance information is acquired based on tilt information, which is obtained by a tilt sensor from the first distance information and the second distance information, being greater than or equal to a threshold tilt in a direction of a specific shaft.

13. The method of claim 9, wherein the main body has a spherical shape, and
wherein the first drive wheel and the second drive wheel are spaced apart from each other and surround the main body in an outer side of the main body.

* * * * *